Dec. 31, 1929.  G. H. ACKER  1,741,671
WORM GEARED REDUCTION UNIT
Filed Aug. 14, 1925
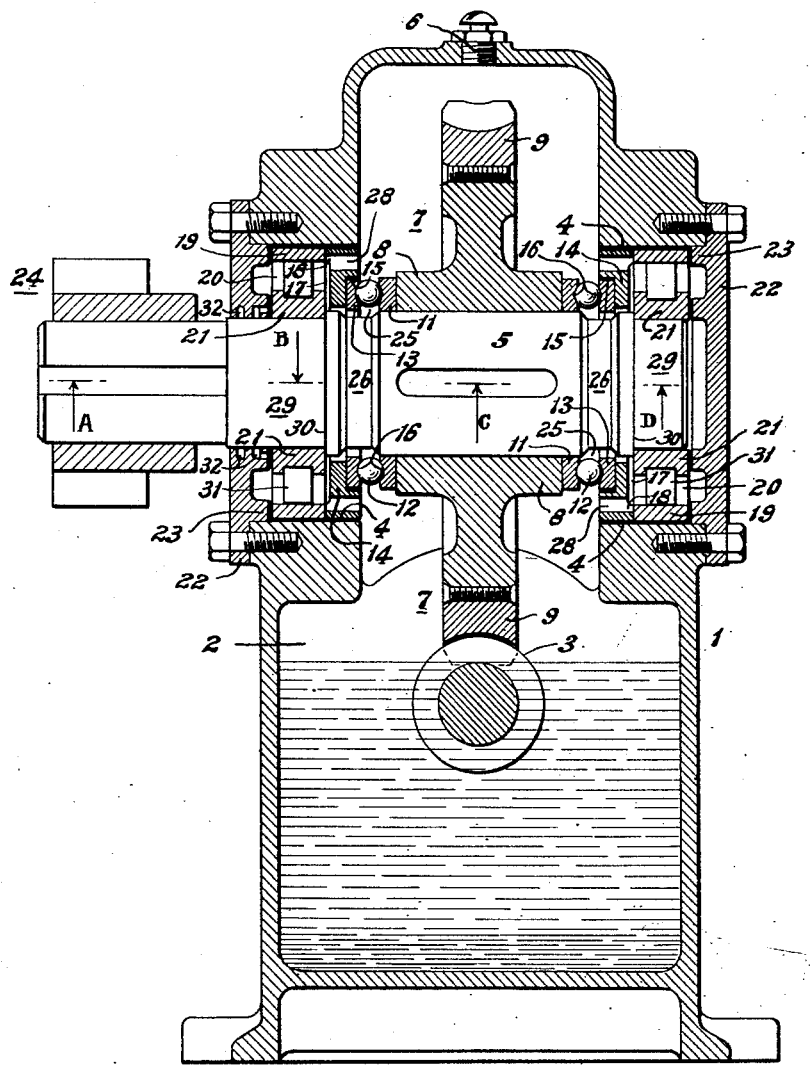
INVENTOR.
George H. Acker.
BY Albert M. Austin
ATTORNEYS.

Patented Dec. 31, 1929

1,741,671

UNITED STATES PATENT OFFICE

GEORGE H. ACKER, OF CLEVELAND, OHIO, ASSIGNOR TO THE CLEVELAND WORM AND GEAR COMPANY, OF CLEVELAND, OHIO, A CORPORATION OF OHIO

WORM-GEARED REDUCTION UNIT

Application filed August 14, 1925. Serial No. 50,153.

This invention relates to improvements in the mounting of the worm wheel of a worm geared reduction unit. According to the invention an overhung wheel may be used on the same shaft as the worm wheel but no outside bearing is necessary. The two bearing assemblies on either side of the worm wheel are made so that they will withstand all the radial and axial stress caused by the overhung wheel and the worm, with a minimum of wear, thereby insuring unusually long life of the bearing assemblies. Furthermore, according to the invention provision is made so that the bearings are well lubricated at all speeds of the worm wheel.

Various other objects and advantages of the invention will be obvious from the following particular description of one form of mechanism embodying my invention or from an inspection of the accompanying drawings and the invention also consists in certain new and novel features of construction and combinations of parts hereinafter set forth and claimed.

In the accompanying drawings I have shown for purposes of illustration one form of mechanism embodying the invention, in which—

The single figure is a longitudinal section taken through the worm wheel shaft.

In the following description and in the claims parts will be identified by specific names for convenience, but they are intended to be as generic in their application to similar parts as the art will permit.

Referring to the drawing, the unit comprises a housing denoted generally by 1. The housing has a suitable reservoir 2 in its base, the walls of the reservoir being provided with suitable bearings for mounting the worm 3. The reservoir 2 is filled with a lubricant such as oil up to a level slightly over the lowermost position of the worm wheel 7 as indicated in the drawing. The walls of the reservoir 2 are greatly spaced from the worm 3 to prevent any substantial pumping action on the lubricant which action would be present if the walls closely fit the worm. The upper walls of the housing are provided with openings 4 to provide a bearing surface for the worm wheel shaft 5 and its bearing assemblies. The upper wall of the housing may be provided with an opening which is closed by a suitable closure member 6. The shaft 5 is a plain cylindrical shaft and has its largest diameter at the part where the worm wheel 7 is seated. The worm wheel may be of any desired construction and for purposes of illustration is shown as comprising a hub member 8 and a toothed rim 9 suitably secured thereto. The teeth on the toothed rim mesh with the spiral teeth on the worm 3 as is well understood.

On either side of the worm wheel are mounted the inside races 11 of axial thrust bearings 12 which may be of the rolling friction type such as ball-bearings. The worm wheel 7 and the inside races 11 of the axial thrust bearings have a press fit on the shaft 5. The outside races 13 of the axial thrust bearings 12 are bored larger than the shaft 5 and do not touch it at any point. The outside races 13 are centered in adapter plates 14 which are seated in the bearing surfaces 4 in the walls of the housing. The adapter plates are provided with recesses 15 which hold the outer races of the axial thrust bearings in such manner that the outer races are free to play slightly radially to take care of any eccentricity there may be between the ball grooves 16 and the outer diameter.

The adapter plates 14 are provided with outside recesses 17 to form an annular rim 18 which abuts the outer races 19 of the radial thrust bearings 20, the adapter plates being clear of the other parts of the radial thrust bearings 20. The adapter plates 14 also have a plurality of oil drain holes therein for a purpose hereinafter described in detail.

The shaft 5 is provided with reduced portions 29 to provide seats for the inner races 21 of the radial thrust bearings 20. Shoulders 30 limit the inward movements of the inner races 21. The radial thrust bearings 20 may be of the rolling friction type such as roller bearings, the rollers being denoted by 31. The outer races 19 of the radial thrust bearings fit into the bearing surfaces 4 in such manner that they can creep slightly under load. The fit between the adapter plates 14 and the bearing surfaces 4 is of the same kind, that is, the outer diameter of the adapter plates 14 conforms to the outer diameter of the outer races 19.

Clamping plates 22 are provided for holding the parts in assembled relation, the clamping plates being provided with annular flanges 23 which bear against the outer races 19 of the radial thrust bearings only. The clamping plate 22 through which the shaft 5 passes may be provided with some kind of oil sealing device 32 to prevent loss of lubricant along the shaft 5. On the extended end of the worm wheel shaft 5 a wheel 24 may be overhung such as a sprocket or a pinion. It will be noted that no bearing is necessary on the outside end of this wheel, the bearings on either side of the worm wheel 7 taking all the stresses.

The axial fit in the various parts between the clamping plates 22 is made purposely loose to a slight extent so that there is no positive locking of the outer races 19 of the radial thrust bearings 20 thereby allowing them to creep slightly under load, a provision which will uniformly distribute any wear in these bearings about the bearing. It is obvious that a locked outer race would tend to wear out of round at the point which took most of the load.

The arrows A, B, C and D represent the direction of the radial stresses on the shaft 5 caused by the gears. The arrows A and C represent the stresses due to the wheels 24 and 7 respectively and the arrows B and D represent the resisting stresses of the bearings. It will be seen that the axial thrusts on the shaft 5 will be transmitted through the axial thrust bearings 12 to the clamping plates through the adapter plates 14 and outer races 19 of the radial thrust bearings 20, the outer races 19 merely acting as spacers in handling the axial thrust load.

The two conditions of operation under which the bearings must be lubricated are (a) when the rotative speed of the worm wheel 7 is high enough to result in oil being thrown from the gear onto the housing walls and (b) when the speed of the worm wheel 7 is low enough so that oil will run down the sides of the wheel as a given part of the wheel revolves from the lower to the upper position.

In the first case, the oil thrown from the wheel onto the housing wall runs down the housing wall, across the adapter plates 14 and into the ball clusters 25 where it is collected, and eventually deposited, in part, in the annular recesses 26 in the shaft adjacent the radial thrust bearings 20. The slight clearance between the shaft 5 and the adapter plates 14 serves to draw this oil into the clearance space between the inner axial thrust bearing races 21 and the adapter plates 14 since these inner races are rotating and the adapter plates 14 are stationary. From the clearance spaces the oil works into the roller bearings 20, excess being drained back into the oil reservoir through the drain holes 28 in the adapter plates 14. Since these adapter plates are free to creep in a manner similar to the radial thrust bearing outer races 19, the drain holes 28 are drilled at intervals in the adapter plates, providing proper radial bearing drainage for any position of the adapter plates.

With low speed wheel operation, the lubricant runs down the wheel side onto the hubs, and also is thrown, by the agitation of the oil in the oil reservoir by the worm rotation, onto the hubs, whence it runs into the axial thrust bearing ball clusters 25, from where it works into the radial thrust bearings in the manner explained above.

Thus it will be seen that with a construction according to the invention only two bearings are required for the worm wheel shaft of a worm geared reduction unit, thereby obviating the necessity for a third bearing outside the outer gear wheel on the worm wheel shaft. These two bearings, because of the novel arrangement and combination of parts comprising the bearings, are sufficient to take all the axial and radial loads placed upon the shaft by the wheels. Furthermore, according to the invention, both the axial and radial thrust bearings are certain to obtain proper lubrication at all speeds.

While I have shown and described and have pointed out in the annexed claims certain novel features of my invention, it will be understood that various omissions, substitutions and changes in the forms and details of the device illustrated and in its operation may be made by those skilled in the art without departing from the spirit of my invention.

I claim:

1. A worm gear reduction unit comprising a pair of spaced supports having bearing surfaces, a shaft subject to both radial and axial stress having journals cooperating with said bearing surfaces, a worm wheel secured to said shaft, rolling friction type axial thrust bearings having their first races abutting said wheel, rolling friction type radial thrust bearings between said journals and said bearing surfaces, adapter plates between the second races of said axial bearing and said radial bearings, said adapter plates having portions contacting the outer races of and clearing the inner races of said radial bearings and clamping plates secured to said walls and contacting said outer races and clearing said inner races, a worm in mesh with said wheel, and a second wheel overhung on said shaft outside said supports.

2. A worm gear reduction unit comprising a pair of spaced supports having bearing surfaces, a shaft subject to both radial and axial stress having journals cooperating with said bearing surfaces, a worm wheel and abutment means secured to said shaft, rolling friction type axial thrust bearings having their first races abutting said abutment means, rolling friction type radial thrust bearings between said journals and said bearing surfaces, and means for transferring stress from the second races of said axial bearings to said supports through the outer races of said radial bearings, a worm in mesh with said wheel, and a second wheel overhung on said shaft outside said supports.

3. A bearing unit comprising a support having a bearing surface, a shaft passing through said support having a journal cooperating with said bearing surface, said shaft being subject to both radial and axial stress, a rolling friction type radial bearing between said journal and said surface, the outer race of said radial bearing having a creeping fit with said surface, the inner race of said radial bearing being secured to said journal, an adapter having a creeping fit with said surface, said adapter having a portion engaging the outer race of said radial bearing, said adapter having drain holes, a rolling friction type axial bearing having its outer race abutting said adapter, means for securing the inner race of said axial bearing to said shaft, said shaft having an annular groove adjacent said axial bearing, the clearance space between said shaft and the outer race of said axial bearing being small and communicating with said groove, a clamping plate secured to said support and contacting the outer race of said roller bearing, and means for holding said bearings in assembled relation.

4. A bearing unit comprising a support having a bearing surface, a shaft passing through said support having a journal cooperating with said bearing surface, said shaft being subject to both radial and axial stress, a roller bearing between said journal and said surface, the outer race of said roller bearing having a creeping fit with said surface, the inner race of said roller bearing being secured to said journal, an adapter having a creeping fit with said surface, said adapter having a portion engaging the outer race of said roller bearing, said adapter having drain holes and a recess, a ball bearing having its outer race in said recess, the fit between said recess and race being such as to allow said race to adjust itself to the eccentricity of its groove, means for securing the inner race of said ball bearing to said shaft, said shaft having an annular groove adjacent said ball bearing, the clearance space between said shaft and the outer race of said ball bearing being small and communicating with said groove, a clamping plate secured to said support and contacting the outer race of said roller bearing, and means for holding said bearings in assembled relation.

5. A bearing unit comprising a wall having a bearing surface, a shaft passing through said wall having a journal cooperating with said bearing surface, said shaft being subject to both radial and axial stress and having a gear wheel thereon, a rolling friction type radial bearing between said journal and said surface, the inner race of said roller bearing being secured to said journal, an adapter having a portion engaging the outer race of said roller bearing, said adapter having drain holes, a rolling friction type axial bearing having its outer race abutting said adapter the inner race of said axial bearing abutting said wheel, said shaft having an annular groove adjacent said ball bearing, the clearance space between said shaft and the outer race of the ball bearing being small and communicating with said groove, and means for holding said bearings in assembled relation, the inner face of said adapter being flush with the inner surface of said wall.

6. A bearing unit comprising a wall having a bearing surface, a shaft passing through said wall having a journal cooperating with said bearing surface, said shaft being subject to both radial and axial stress and having a gear wheel thereon, a roller bearing between said journal and said surface, the outer race of said roller bearing having a creeping fit with said surface, the inner race of said roller bearing being secured to said journal, an adapter having a creeping fit with said surface, said adapter having a portion engaging the outer race of said roller bearing, said adapter having drain holes, a ball bearing having its outer race abutting said adapter the inner race of said ball bearing abutting said wheel, said shaft having an annular groove adjacent said ball bearing, the clearance space between said shaft and the outer race of the ball bearing being small and communicating with said groove, and means for holding said bearings in assembled relation, the inner face of said adapter being flush with the inner surface of said wall.

7. A bearing unit comprising a wall having a bearing surface, a shaft passing through said wall having a journal cooperating with said bearing surface, said shaft being subject to both radial and axial stress and having a gear wheel thereon, a rolling friction type radial bearing between said journal and said surface, the inner race of said radial bearing being secured to said journal, an adapter having a portion for engaging the outer race of said radial bearing, said adapter having drain holes, a rolling friction type axial bearing having its outer race abutting said adapter to the inner race of said axial bearing abutting said wheel, said shaft having an annular groove adjacent said ball bearing, the clearance space between said shaft and the outer race of the ball bearing being small and communicating with said groove, means for holding said bearings in assembled relation, and means whereby lubricant may flow, depending on the speed of rotation of said wheel either from the inner surface of said wall or from said wheel into said axial bearing thence into said groove and through said clearance space into said radial bearing whence it may drain out through said drain holes.

8. A bearing unit comprising a wall having a bearing surface, a shaft passing through said support having a journal, said shaft having a gear wheel thereon, a radial bearing between said journal and surface, an axial bearing between said wheel and radial bearing, means for holding said bearings in assembled relation, and means whereby lubricant may flow either from the inner surface of said wall or from said wheel into said axial bearing, thence into a groove in said shaft and through a clearance space between said axial bearing and said shaft into said radial bearing.

9. A worm gear reduction unit comprising a pair of spaced supports, a shaft subject to both radial and axial stress, a worm wheel secured to said shaft, means including rolling friction type bearings for taking said stress, a power transmitting device on said shaft outside said supports in overhung relation and a worm in mesh with said worm wheel, and means for continually supplying lubricant to said bearings during rotation of said shaft, said power transmitting device being adapted to exert radial stress on said shaft.

In testimony whereof I have hereunto set my hand.

GEORGE H. ACKER.